US012610012B2

(12) United States Patent
Noguchi et al.

(10) Patent No.: US 12,610,012 B2
(45) Date of Patent: Apr. 21, 2026

(54) MOVING OBJECT CONFERENCE SYSTEM

(71) Applicant: HONDA MOTOR CO., LTD., Tokyo (JP)

(72) Inventors: Takashi Noguchi, Tokyo (JP); Ryosuke Tanaka, Tokyo (JP); Shinichi Kikuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 18/405,148

(22) Filed: Jan. 5, 2024

(65) Prior Publication Data

US 2024/0305719 A1 Sep. 12, 2024

(30) Foreign Application Priority Data

Mar. 10, 2023 (JP) ................................. 2023-038104

(51) Int. Cl.
*H04M 3/56* (2006.01)

(52) U.S. Cl.
CPC ........... *H04M 3/563* (2013.01); *H04M 3/562* (2013.01); *H04M 2203/5081* (2013.01)

(58) Field of Classification Search
None
See application file for complete search history.

(56) References Cited

U.S. PATENT DOCUMENTS

| | | | |
|---|---|---|---|
| 2013/0030645 A1* | 1/2013 | Divine | B60K 35/28 709/217 |
| 2017/0041356 A1* | 2/2017 | Nelson | H04L 65/403 |
| 2018/0060253 A1* | 3/2018 | Gao | B60K 35/81 |
| 2023/0316235 A1* | 10/2023 | Heaton | B60W 40/09 705/7.19 |

FOREIGN PATENT DOCUMENTS

JP 2022-129626 A 9/2022

* cited by examiner

*Primary Examiner* — Antim G Shah
(74) *Attorney, Agent, or Firm* — Rankin, Hill & Clark LLP

(57) ABSTRACT

A moving object conference system is a system for a passenger to participate in an online conference via a communication network in an interior of a moving object, and includes a management unit managing conference information which is communication information of the online conference, for each of interior participants participating in the online conference from the interior of the moving object, and the management unit, for a common online conference that the plurality of interior participants participate in, displays shared information to be distributed to all the participants of the common online conference, of the conference information, on a shared display device shared in the interior of the moving object, and displays an individual operation screen to be individually operated by the participant of the common online conference on an individual touch panel which can be individually operated by the interior participant from a seated position.

5 Claims, 8 Drawing Sheets

Web CONFERENCE: CURRENT YEAR PRODUCT PLANNING CONFERENCE

HOLDING DATE AND TIME: MARCH 3, 2023
10:00–12:00

IN-VEHICLE PARTICIPANT LIST :
> INPUT YOUR OWN SEAT

| PERSON A | DRIVER'S SEAT ▽ | CONFIRMATION |
| PERSON B | ASSISTANT DRIVER'S SEAT ▽ | CONFIRMATION |
| PERSON C | REAR LEFT ▽ | CONFIRMATION |

IN-VEHICLE CONFERENCE SYSTEM

VEHICLE IDENTIFICATION : *****

TIME : 9:44

30      31      32

MOVING OBJECT CONFERENCE SYSTEM

INCORPORATION BY REFERENCE

The present application claims priority under 35 U.S.C. § 119 to Japanese Patent Application No. 2023-038104 filed on Mar. 10, 2023. The content of the application is incorporated herein by reference in its entirety.

BACKGROUND OF THE INVENTION

Field of the Invention

The present invention relates to a moving object conference system.

Description of the Related Art

In recent years, an approach of providing access to a sustainable transportation system considering even vulnerable people among traffic participants is gaining momentum. Towards the realization, the focus is on research and development for further improving traffic safety and convenience through research and development regarding a vehicle allocation service, ridesharing and sharing.

In ridesharing that multiple people ride in a same vehicle, it is assumed that an online conference is held inside the vehicle.

Japanese Patent Laid-Open No. 2022-129626 discloses an in-vehicle terminal device which is loaded in a vehicle and configures an electronic conference system. In the in-vehicle terminal device, according to a state of the vehicle, output or non-output of opposite side voice from a speaker inside the vehicle is switched and transmission or non-transmission of a vehicle side voice signal to an opposite side terminal device is switched.

Now, in a vehicle allocation service, ridesharing and sharing, when a plurality of passengers in a vehicle participate in a common online conference, a problem is to simultaneously secure a sense of unity for conference participation by sharing information inside the vehicle and a degree of freedom in individual setting such as adjustment of conference voice and propriety of video provision, the individual setting being individually performed by the passengers who are conference participants.

In order to solve the above-described problem, an object of the present application is to enable each passenger to freely change individual setting relating to conference participation, such as adjustment of conference voice and propriety of video provision, while increasing a sense of unity for the conference participation inside a moving object, when holding an online conference inside the moving object such as a vehicle, thereby contributing to development of a sustainable transportation system.

SUMMARY OF THE INVENTION

One mode of the present invention aspect is a moving object conference system for a passenger to participate in an online conference via a communication network in an interior of a moving object, the moving object conference system includes a management unit configured to manage conference information which is communication information of the online conference, for each of interior participants participating in the online conference from the interior of the moving object, and the management unit, for a common online conference that the plurality of interior participants participate in, displays shared information to be distributed to all the participants of the common online conference, of the conference information, on a shared display device shared in the interior of the moving object, and displays an individual operation screen to be individually operated by the participant of the common online conference on an individual touch panel which can be individually operated by the interior participant from a seated position.

According to another mode of the present invention aspect, a seat discrimination unit configured to discriminate a seat position where each of the interior participants is seated is provided, and the management unit displays the individual operation screen for each of the interior participants on the individual touch panel which can be individually operated from the seat position of the corresponding interior participant, based on the seat position of each of the interior participants.

According to a further mode of the present invention aspect, the seat discrimination unit acquires input indicating the seat position of the interior participant via the individual touch panel.

According to a still further mode of the present invention aspect, the management unit acquires an instruction regarding setting of an imaging device which individually photographs the interior participant, a voice input device and a voice output device individually used by the interior participant, and/or a display screen of the individual touch panel via the individual operation screen, and sets the imaging device, the voice input device, the voice output device and/or the display screen based on the acquired instruction.

According to a yet further mode of the present invention aspect, the individual touch panel is disposed in front of each seat of the moving object.

According to the present invention aspect, when holding an online conference inside a moving object, it is possible to enable each passenger to freely change individual setting relating to conference participation while increasing a sense of unity for the conference participation inside the moving object.

DETAILED DESCRIPTION OF THE PREFERRED EMBODIMENTS

Embodiment

Hereinafter, the embodiment of the present invention will be explained with reference to the drawings.

Figure 1:
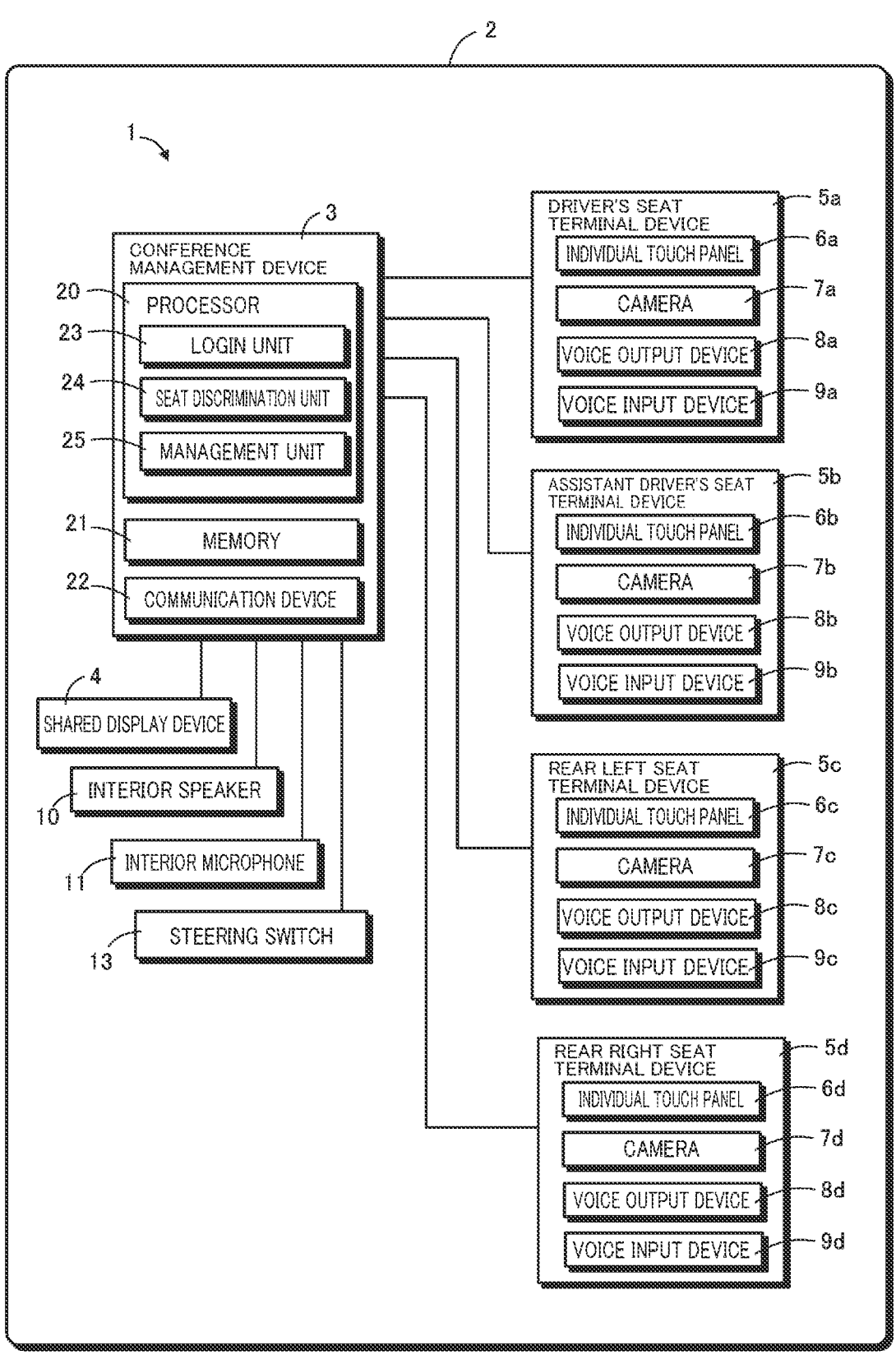
FIG. 1 is a diagram illustrating a configuration of a moving object conference system according to one embodiment of the present invention.

FIG. 1 is a diagram illustrating a configuration of a moving object conference system 1 according to one embodiment of the present invention. The moving object conference system 1 is loaded in a moving object 2, and is used for a passenger of the moving object 2 to participate in an online conference via an external communication network outside the moving object 2 in an interior of the moving object 2.

The moving object 2 is a vehicle, for example, in the present embodiment. Yet, the moving object 2 is not limited to the vehicle and may be an arbitrary moving object which includes a cabin (passenger compartment) where passengers get on to enable multiple people to get on. Such a moving object may be, in addition to a land moving object such as a passenger car, a bus and a taxi, a marine moving object such as a ship and a submarine, an air moving object such as an aircraft including an eVTOL (Electric Vertical Take-Off and Landing aircraft) and an airship, or a space moving object such as a spacecraft and an artificial satellite.

The moving object conference system 1 includes a conference management device 3, a shared display device 4 shared in the interior of the moving object 2, a driver's seat terminal device 5a, an assistant driver's seat terminal device 5b, a rear left seat terminal device 5c, and a rear right seat terminal device 5d. The shared display device 4 is disposed at a position where it is easy to see from all the passengers seated in the interior of the moving object 2. The shared display device 4 is, for example, a touch panel. The moving object conference system 1 may further include an interior speaker 10 disposed in the interior of the moving object 2, an interior microphone 11, and a steering switch 13 provided on a steering wheel 12 used for steering the moving object 2.

The driver's seat terminal device 5a includes an individual touch panel 6a, a camera 7a, a voice output device 8a, and a voice input device 9a, inside a same housing. Similarly, the assistant driver's seat terminal device 5b includes an individual touch panel 6b, a camera 7b, a voice output device 8b, and a voice input device 9b. In addition, the rear left seat terminal device 5c and the rear right seat terminal device 5d include individual touch panels 6c and 6d, cameras 7c and 7d, voice output devices 8c and 8d, and voice input devices 9c and 9d, respectively.

Hereinafter, the driver's seat terminal device 5a, the assistant driver's seat terminal device 5b, the rear left seat terminal device 5c and the rear right seat terminal device 5d are generically called terminal devices 5 as well. In addition, the individual touch panels 6a, 6b, 6c and 6d are generically called individual touch panels 6 as well. The terminal device 5 displays an individual operation screen (to be described later) on the individual touch panel 6 based on an instruction from a management unit 25 of a processor 20 provided in the conference management device 3 to be described later, and displays a screen provided by an application program on the individual touch panel 6 based on an instruction input via the individual touch panel 6.

Further, hereinafter, the cameras 7a, 7b, 7c and 7d are generically called cameras 7 as well. In addition, the voice output devices 8a, 8b, 8c and 8d are generically called voice output devices 8 as well, and the voice input devices 9a, 9b, 9c and 9d are generically called voice input devices 9 as well.

Figure 2:
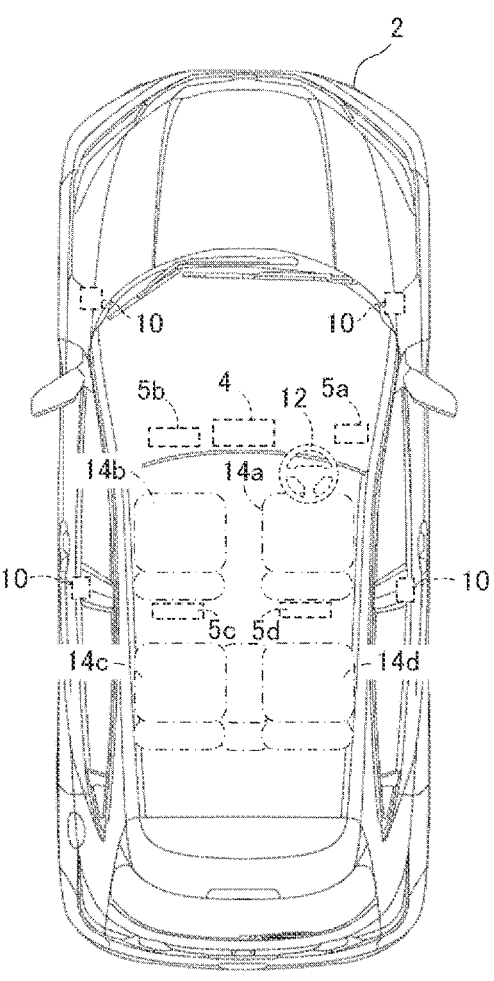
FIG. 2 is a diagram illustrating an example of arrangement, in a moving object, of each device configuring a moving object conference system 1.

FIG. 2 is a diagram illustrating an example of arrangement of each device configuring the moving object conference system 1 in the moving object 2. Further, FIG. 3 illustrates arrangement at interior front of the moving object 2, and FIG. 4 illustrates an example of arrangement viewing the interior front from a rear seat of the moving object 2.

Figure 3:
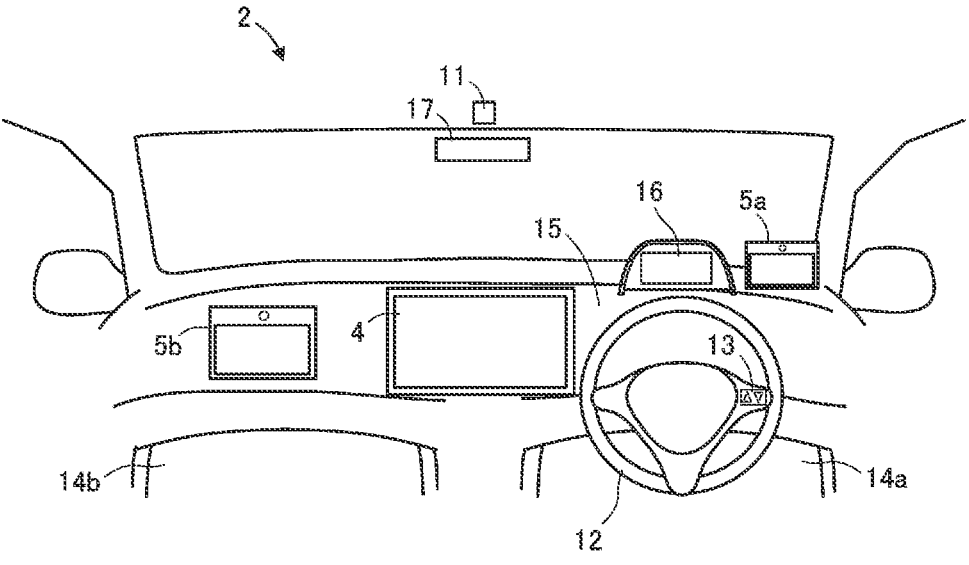
FIG. 3 is a diagram illustrating an example of arrangement at interior front of a moving object.
Figure 4:
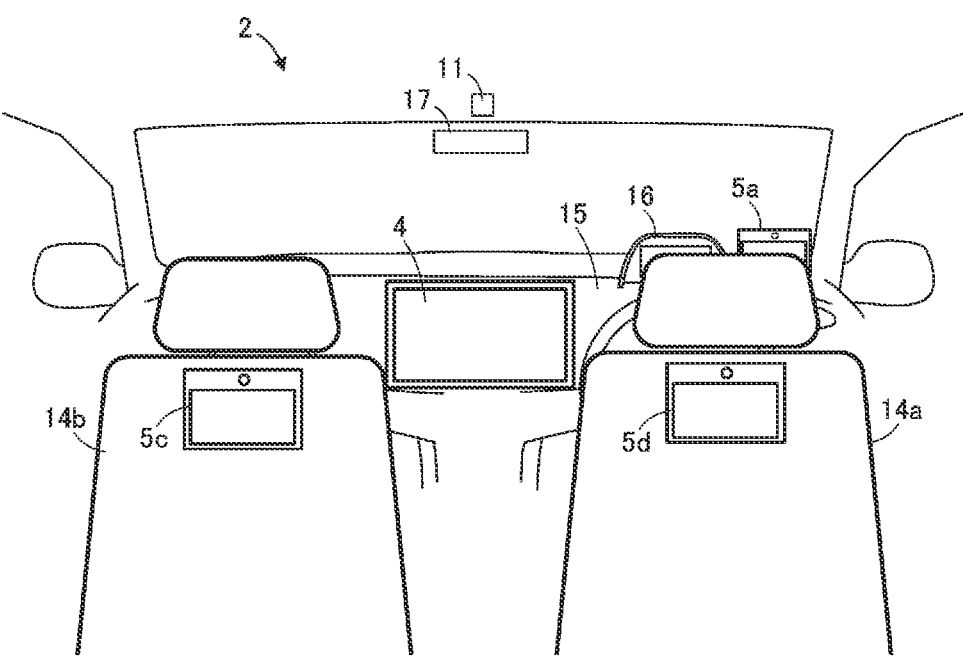
FIG. 4 illustrates an example of arrangement viewing the interior front from a rear seat of the moving object.

As illustrated in FIG. 2, FIG. 3 and FIG. 4, the shared display device 4 is disposed at a center in a vehicle width direction of an instrument panel 15, for example, as a position where it is easy to see from all the passengers seated in the interior of the moving object 2. The shared display device 4 is, for example, a touch panel.

Note that the shared display device 4 may be an arbitrary display device as long as a screen is provided on a position where it is easy to see from all the passengers seated in the interior of the moving object 2. For example, the shared display device 4 may be a projector which projects an image on a ceiling surface in the interior of the moving object 2 as the position where it is easy to see from all the passengers seated in the interior of the moving object 2. In addition, in the moving object 2, four interior speakers 10 for example are distributed and disposed in the interior of the moving object 2. In the present embodiment, the interior speakers 10 are disposed respectively on inner surfaces of front left and right doors and inner surfaces of rear left and right doors (FIG. 2). Further, at the front of the interior of the moving object 2, the interior microphone 11 is disposed at a ceiling part above a rearview mirror 17 (FIG. 3).

As illustrated in FIG. 2, FIG. 3 and FIG. 4, each of the terminal devices 5 is disposed at a position where it can be individually operated from a seat position of a corresponding passenger. Here, a seat of the corresponding passenger for the terminal devices 5 is a driver's seat 14a for the driver's seat terminal device 5a, and is an assistant driver's seat 14b for the assistant driver's seat terminal device 5b, hereinafter. In addition, the seat of the corresponding passenger for the rear left seat terminal device 5c and the rear right seat terminal device 5d is a rear left seat 14c and a rear right seat 14d, respectively. Hereinafter, the driver's seat 14a, the assistant driver's seat 14b, the rear left seat 14c and the rear right seat 14d are generically called seats 14 as well.

Each of the terminal devices 5 is disposed in front of the seat of the corresponding passenger, as the position where it can be individually operated from the seat position of the corresponding passenger. Specifically, as illustrated in FIG. 2 and FIG. 3, the driver's seat terminal device 5a is disposed on a right side of a meter panel 16 of the instrument panel 15 in front of the driver's seat 14a. In addition, the assistant driver's seat terminal device 5b is disposed at the position in front of the assistant driver's seat 14b on the instrument panel 15. Further, as illustrated in FIG. 2 and FIG. 4, the rear left seat terminal device 5c and the rear right seat terminal device 5d are disposed on back surfaces (that is, surfaces facing the rear left seat 14c and the rear right seat 14d) of backrests of the assistant driver's seat 14b and the driver's seat 14a in front of the rear left seat 14c and the rear right seat 14d, respectively.

Note that, while the individual touch panel 6 is provided inside the housing of the terminal device 5 in the present embodiment, the individual touch panel 6 may be provided in a housing different from the terminal device 5. In this case, at least the individual touch panel 6 may be disposed at the position where it can be individually operated from the seat position of the corresponding passenger.

Each of the cameras 7 provided in the terminal devices 5 acquires an image (for example, a face image) of the passenger seated on the corresponding seat. In addition, the voice output device 8 and the voice input device 9 input and output voice via an earphone with a microphone or a headset (both are not illustrated) used by the passenger seated on the corresponding seat, for example.

With reference to FIG. 1, the conference management device 3 includes the processor 20, a memory 21, and a communication device 22. The memory 21 is configured, for example, by a volatile and/or nonvolatile semiconductor memory, and/or a hard disk device or the like. The communication device 22 is a transmitter/receiver for the conference management device 3 to wirelessly communicate with an external device via the external communication network. The external device may include a conference server which supports holding of an online conference according to prior art, for example.

The processor 20 is a computer including a CPU or the like, for example. The processor 20 may include a ROM in which a program is written, and a RAM for temporary storage of data, or the like. Then, the processor 20 includes a login unit 23, a seat discrimination unit 24, and the management unit 25, as functional elements or functional units.

The functional elements provided in the processor 20 are realized by the processor 20 which is a computer executing a program preserved in the memory 21, for example. Note that the program can be stored in a computer-readable arbitrary storage medium. Instead, all or a part of the functional elements provided in the processor 20 can be also configured by hardware including one or more electronic circuit components, respectively.

The login unit 23 receives, via the communication device 22, a conference holding notice for an online conference, which is transmitted from the external device to the moving object 2 via the external communication network. The conference holding notice transmitted to the moving object 2 may include, for example, date and time of holding the online conference and a list of participants scheduled to participate in the online conference in the moving object 2.

Shortly before (15 minutes before, for example) the date and time specified by the received conference holding notice comes, the login unit 23 displays a login screen for login to the online conference at a predetermined device of the shared display device 4 and the terminal devices 5. For example, the login screen is displayed on the individual touch panel 6 or the shared display device 4 which is easy to operate from the seat where a person (one of the passengers including a driver) hosting participation in the online conference in the moving object 2 is scheduled to be seated.

When the passenger of the moving object 2 performs a login operation to the displayed login screen, the login unit 23 communicates with a conference server or the like and logs in to the online conference according to the prior art.

Hereinafter, the passenger of the moving object 2 participating in the online conference from the interior of the moving object 2 is called an interior participant.

The seat discrimination unit 24 discriminates the seat position of the seat 14 where the interior participant is seated in the moving object 2 for each of the interior participants. For example, the seat discrimination unit 24 acquires input indicating the seat position of the interior participant via the individual touch panel 6.

Specifically, when the login unit 23 logs in to the online conference, the seat discrimination unit 24 displays a seat input screen on the individual touch panel 6 of each terminal device 5. Each participant participating in the online conference from the moving object 2 gets on the moving object 2, sits on one of the seats 14, and inputs the seated position of the participant by the seat input screen displayed on the individual touch panel 6 before the online conference starts.

Figure 5:
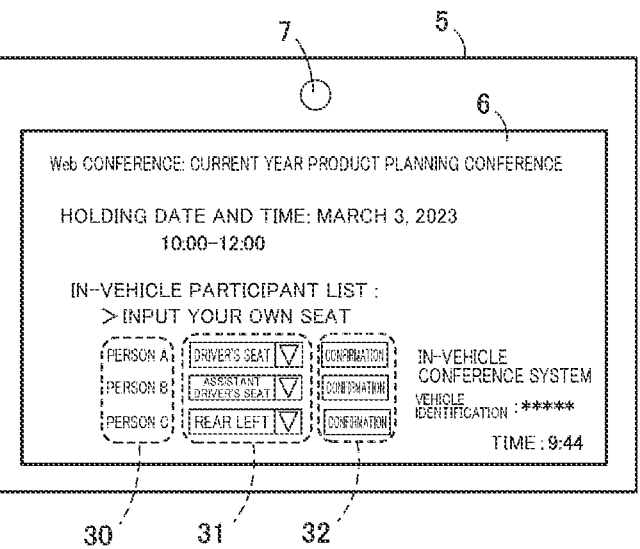
FIG. 5 is an example of a seat input screen displayed on an individual touch panel.

FIG. 5 is an example of the seat input screen displayed on the individual touch panel 6 by the seat discrimination unit

24. In the example of FIG. 5, a scheduled participant list 30 of the online conference is displayed on the individual touch panel 6 of the terminal device 5. On a right side of a name of each participant displayed in the scheduled participant list 30, a selection object 31 for selecting the seat 14 where the participant is seated, and a confirmation button 32 for inputting the seat 14 selected at the selection object 31 are displayed. The selection object 31 may be an object for displaying a dropdown list or a check button list by being touched, for example.

When the interior participant selects the seat 14 where the interior participant is seated at present by the selection object 31 displayed next to his/her own name on the individual touch panel 6 and presses the confirmation button 32 displayed next to it, the seat discrimination unit 24 acquires the input of the seated position of the interior participant. In the example of FIG. 5, it is discriminated that a person A is seated on the driver's seat, a person B is seated on the assistant driver's seat and a person C is seated on the rear left seat, and it is determined that the rear right seat 14d is vacant or a passenger who is not the interior participant is seated.

The management unit 25 manages the conference information which is information communicated for the online conference for each of the interior participants participating in the online conference from the interior of the moving object 2. The conference information is the information communicated via the external communication network with the conference server which is the external device supporting holding of the online conference. The conference information may include video information and audio information for the online conference and operation information for operating functions (for example, a data sharing function and a chat function) provided for the online conference or the like, for example.

Then, for the online conference in common (referred to as a common online conference, hereinafter) that the plurality of interior participants who are the passengers of the moving object 2 participate in, the management unit 25 displays shared information to be distributed to all the participants of the common online conference, of the conference information, on the shared display device 4 that the passengers can see in common in the interior of the moving object 2. The shared information may include, for example, a data image provided by one of the participants (including the participant participating from the outside of the moving object 2 as well) of the online conference, a face image or an icon of a speaker and a list of the participants or the like.

Figure 6:
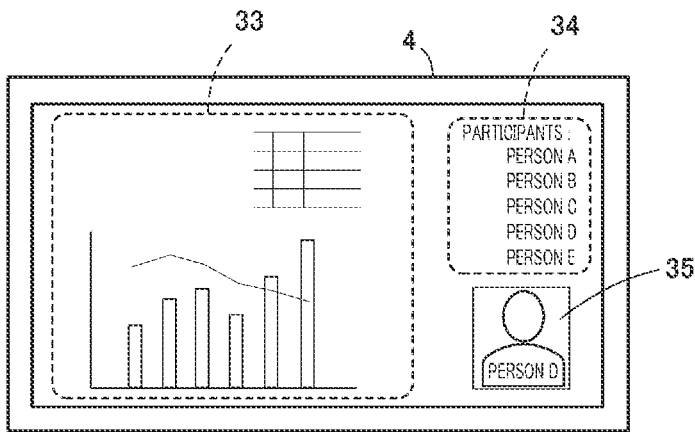
FIG. 6 is a diagram illustrating an example of a display screen of shared information at a shared display device.

FIG. 6 is a diagram illustrating an example of a display screen of the shared information displayed on the shared display device 4 by the management unit 25. In the illustrated example, on the shared display device 4, a data image 33 shared by one of the participants, a participant list 34 of the participants of the online conference, and a speaker icon 35 indicating a present speaker who speaks using the data image 33 are displayed as the shared information.

On the other hand, for the individual operation screen for the participant of the common online conference to individually perform an operation, the management unit 25 displays the operation screen and the conference information on each individual touch panel 6 which can be individually operated by each interior participant from the seated position. The individual operation screen includes, for example, a screen for using various functions including the data sharing function and the chat function or the like provided by the conference server.

Specifically, the management unit 25 displays the individual operation screen of each interior participant on the individual touch panel 6 which can be individually operated from the seat position of the corresponding interior participant, based on the seat position of each interior participant discriminated by the seat discrimination unit 24.

Thus, in the moving object conference system 1, it is possible to enable each passenger to freely change individual setting relating to conference participation while increasing a sense of unity for the conference participation among the passengers of the moving object 2 when holding the online conference inside the moving object 2.

Note that the management unit 25 may not display the shared information on the individual touch panel 6. Yet, the management unit 25 may display the shared information on the individual touch panel 6 when the interior participant inputs an instruction to display the shared information via the corresponding individual touch panel 6.

The management unit 25 also acquires an instruction regarding the setting of the camera 7 which is an imaging device for individually photographing the interior participant, the voice output device 8 and the voice input device 9 individually used by the interior participant, and/or the display screen of the individual touch panel 6, via the individual operation screen displayed on the individual touch panel 6. Then, the management unit 25 sets the camera 7, the voice output device 8, the voice input device 9, and/or the display screen of the individual touch panel 6, based on the acquired instruction. The setting may be, for example, ON/OFF of the camera 7, adjustment of volume output from the voice output device 8 to an earphone or the like, ON/OFF of voice acquisition from a microphone via the voice input device 9, and adjustment of a window size displayed on the individual touch panel 6.

Figure 7:
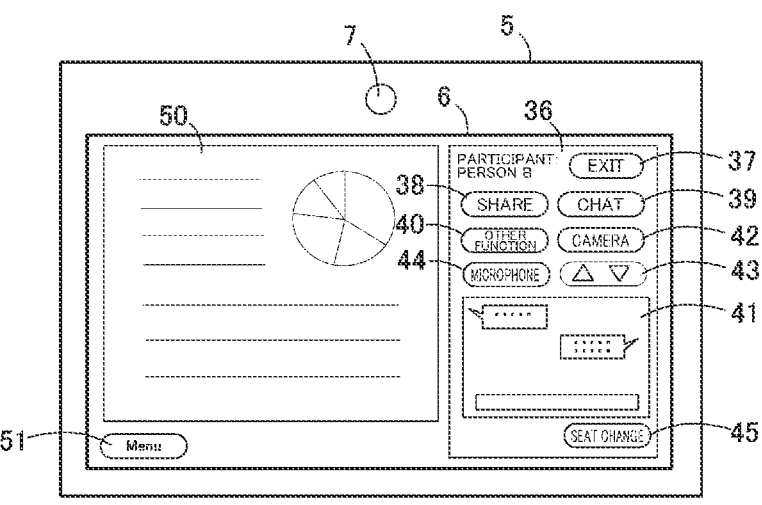
FIG. 7 is a diagram illustrating an example of an individual operation screen displayed on the individual touch panel.

FIG. 7 is a diagram illustrating an example of the individual operation screen displayed on the individual touch panel 6 by the management unit 25. In the illustrated example, an application window 50 is displayed on a left side in the figure of the individual touch panel 6, and an individual operation screen 36 is displayed on a right side part in the figure of the individual touch panel 6. The application window 50 displays a screen of an application activated by the interior participant operating a menu button 51 at lower left in the figure and various activation buttons (not illustrated) displayed by pressing the menu button 51. For example, the application window 50 is used to display the screen of the application for browsing documents. The screen displayed in the application window 50 is shared on the online conference as the screen of shared data by a share button 38 to be described later, for example.

On the individual operation screen 36, as buttons for utilizing the functions provided for the online conference by the conference server, an exit button 37, the share button 38, a chat button 39 and an other function button 40 are displayed. The exit button 37 is a button for existing from the online conference.

In addition, the share button 38 is a button for starting the data sharing function of the online conference, and is a button for distributing the image of data to be shared with the other conference participants from the terminal device 5. The chat button 39 is a button for displaying a chat box 41 for chatting with the other conference participants. Further, the other function button 40 is a button for displaying a menu screen for utilizing the other functions (for example, a voice recording function, an image recording function, or a control request function for shared data) provided by the conference server.

On the individual operation screen 36 illustrated in FIG. 7, a camera button 42 for turning ON/OFF image acquisition by the camera 7 provided in the terminal device 5 is displayed further. In addition, on the individual operation screen 36, a volume button 43 used for adjusting the volume of the voice output device 8 provided in the terminal device 5, and a microphone button 44 for turning ON/OFF voice input by the voice input device 9 (that is, turning ON/OFF the microphone) are displayed.

The management unit 25 acquires the input performed by the interior participant using the camera button 42, the volume button 43, and the microphone button 44, and sets the camera 7, the voice output device 8 and the voice input device 9 respectively. Further, for example, when the interior participant drags an outer frame line of the individual operation screen 36, the management unit 25 performs an operation of the display screen such as changing a size of the individual operation screen 36 according to the drag operation.

In addition to the buttons for utilizing the functions provided by the conference server and the buttons for setting the camera 7 or the like, the management unit 25 may display buttons of various utility functions to be needed accompanying online conference participation on the individual operation screen. For example, on the individual operation screen 36 illustrated in FIG. 7, a seat change button 45 to be used when notifying the conference management device 3 a seat of a change destination when the interior participant changes the seat is displayed.

When the seat change button 45 is pressed, for example, buttons similar to the selection object 31 and the confirmation button 32 illustrated in FIG. 5 are displayed, and selection and confirmation input of the seat of the change destination are performed. The seat discrimination unit 24 acquires the input of the seat specification, and the management unit 25 can display the individual operation screen for the interior participant on the individual touch panel 6 of the terminal device 5 which can be operated at the seat of the change destination, based on the input of the seat specification.

Figure 8:
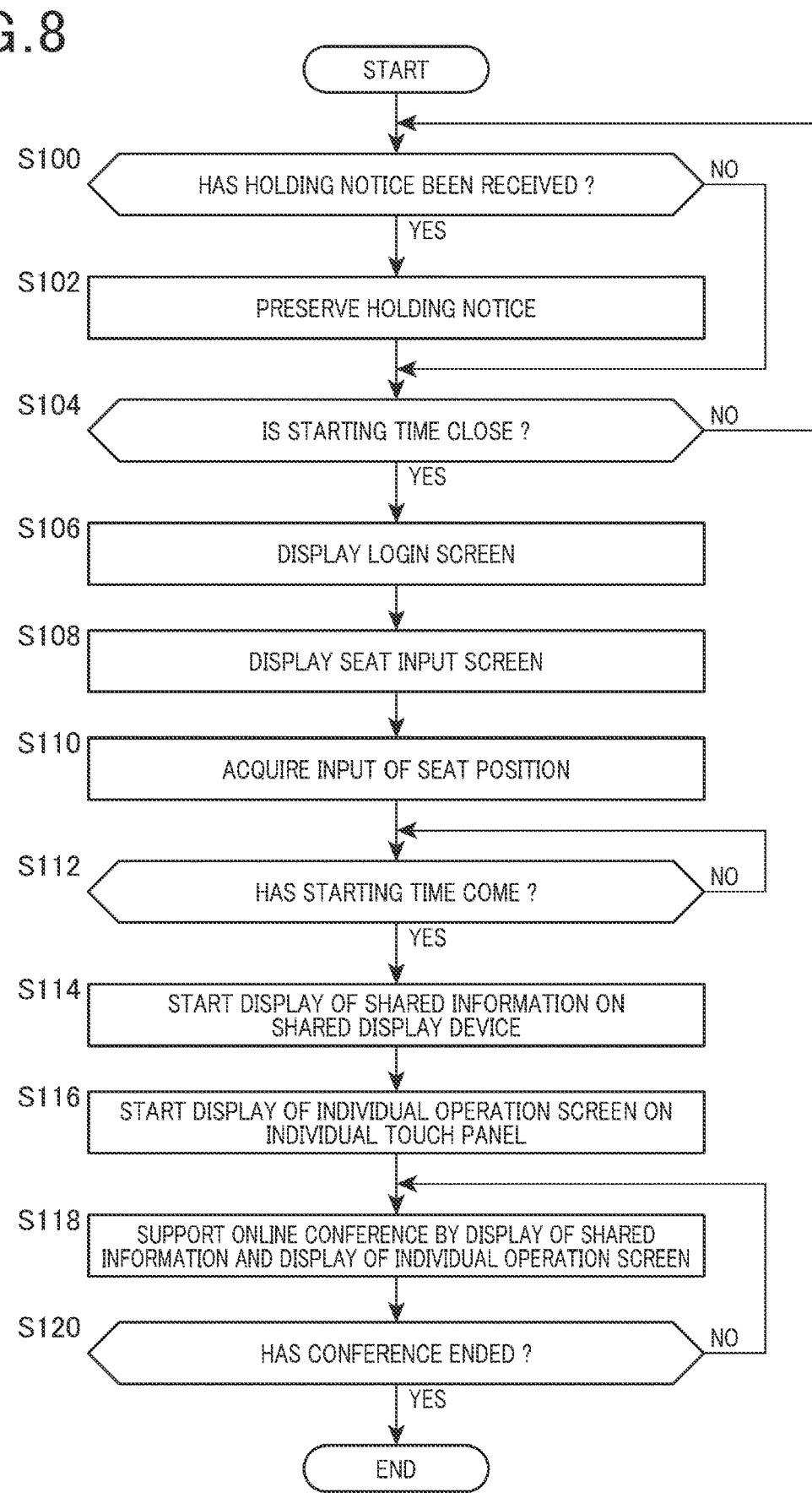
FIG. 8 is a flowchart illustrating a procedure of an operation in the moving object conference system.

Next, an operation of the moving object conference system 1 will be explained. FIG. 8 is a flowchart illustrating a procedure of the operation in the moving object conference system 1. Processing in FIG. 8 is repeatedly executed.

When the processing is started, the login unit 23 of the conference management device 3 determines whether or not an online conference holding notice has been received via the external communication network (S100). The holding notice can be transmitted, for example, from the terminal device of the participant hosting the online conference or the conference server.

When the holding notice has been received (S100, YES), the login unit 23 preserves the received holding notice in the memory 21 (S102). Next, the login unit 23 determines whether or not starting time of any common online conference (that is, the online conference in which a plurality of persons are scheduled to participate from the moving object 2) is close, based on the holding notice preserved in the memory 21 (S104). For example, the login unit 23 can determine that the starting time is close when the present time is within predetermined time (for example, 15 minutes) before the starting time.

On the other hand, when the holding notice has not been received in step S100 (S100, NO), the login unit 23 shifts the processing to step S104.

In step S104, when the starting time of the common online conference is not close (S104, NO), the login unit 23 returns to step S100 and repeats the processing.

On the other hand, when the starting time of the online conference is close in step S104 (S104, YES), the login unit 23 displays the login screen on the shared display device 4 or the individual touch panel 6 of one of the terminal devices 5 (S106). When the passenger of the moving object 2 performs the login operation to the displayed login screen, the login unit 23 logs in to the online conference according to the prior art.

Subsequently, the seat discrimination unit 24 displays the seat input screen on each individual touch panel 6 (S108), and acquires the input indicating the seat position, the input being performed by the interior participant, via the individual touch panel 6 (S110).

Next, the management unit 25 determines whether or not the starting time of the common online conference has come (S112). Then, when the starting time has not come (S112, NO), the management unit 25 returns to step S112, repeats the processing, and stands by for the starting time to come.

On the other hand, when the starting time comes (S112, YES), the management unit 25 starts display of the shared information of the common online conference on the shared display device 4 (S114). In addition, the management unit 25 starts the display of the individual operation screen for the interior participant on the individual touch panel 6 provided in the terminal device 5 of each interior participant (S116). Then, by the shared information and the individual operation screen, progress of the common online conference is supported (S118).

Subsequently, the management unit 25 determines whether or not the common online conference has ended (S120). For example, the management unit 25 can determine that the common online conference has ended when all the interior participants who have participated in the common online conference exit from the common online conference by the operation (for example, the operation of the exit button 37) on each individual operation screen.

Then, when the common online conference does not end (S120, NO), the management unit 25 returns to step S118 and repeats the processing. On the other hand, when the common online conference ends (S120, YES), the management unit 25 ends the present processing.

OTHER EMBODIMENTS

In addition to displaying the shared information on the shared display device 4, the management unit 25 may output voice of the common online conference using the interior speaker 10, and distribute the voice in the interior of the moving object 2 acquired using the interior microphone 11 to the terminal devices of the other participants participating in the common online conference from the outside of the moving object 2 and/or the conference server.

The seat discrimination unit 24 may acquire the face image of the passenger seated on the seat 14 by the camera 7 provided in the terminal device 5, identify the interior participant by face authentication, and also discriminate the seated position of each interior participant. The face image for reference needed for the face authentication may be preserved in the memory 21 beforehand, or acquired from another server as the external device.

Note that the present invention is not limited to the configuration of the embodiments described above, and can be implemented in various modes without deviating from the gist.

Configurations Supported by Embodiments Described Above

The embodiments described above support the following configurations.

(Configuration 1) A moving object conference system for a passenger to participate in an online conference via a communication network in an interior of a moving object, including a management unit configured to manage conference information which is communication information of the online conference, for each of interior participants participating in the online conference from the interior of the moving object, wherein the management unit, for a common online conference that the plurality of interior participants participate in, displays shared information to be distributed to all the participants of the common online conference, of the conference information, on a shared display device shared in the interior of the moving object, and displays an individual operation screen to be individually operated by the participant of the common online conference on an individual touch panel which can be individually operated by the interior participant from a seated position.

According to the moving object conference system of configuration 1, it is possible to enable each passenger to freely change individual setting relating to conference participation while increasing a sense of unity for the conference participation inside the moving object when holding the online conference inside the moving object.

(Configuration 2) The moving object conference system according to configuration 1, including a seat discrimination unit configured to discriminate a seat position where each of the interior participants is seated, wherein the management unit displays the individual operation screen for each of the interior participants on the individual touch panel which can be individually operated from the seat position of the corresponding interior participant, based on the seat position of each of the interior participants.

According to the moving object conference system of configuration 2, the seated position of each of the interior participants can be discriminated by the seat discrimination unit, and the management unit can specify the individual touch panel to display the individual operation screen for each interior participant.

(Configuration 3) The moving object conference system according to configuration 2, wherein the seat discrimination unit acquires input indicating the seat position of the interior participant via the individual touch panel.

According to the moving object conference system of configuration 3, the seated position of each of the interior participants can be easily discriminated.

(Configuration 4) The moving object conference system according to any one of configurations 1-3, wherein the management unit acquires an instruction regarding setting of an imaging device which individually photographs the interior participant, a voice input device and a voice output device individually used by the interior participant, and/or a display screen of the individual touch panel via the individual operation screen, and sets the imaging device, the voice input device, the voice output device and/or the display screen based on the acquired instruction.

According to the moving object conference system of configuration 4, each interior participant can perform various adjustments for image transmission, image display and/or sound relating to the conference participation by the individual operation screen displayed on the individual touch panel used by himself/herself so that convenience of the interior participant is improved.

Configuration 5

The moving object conference system according to any one of configurations 1-4, wherein the individual touch panel is disposed in front of each seat of the moving object.

According to the moving object conference system of configuration 5, each interior participant can easily operate the individual operation screen.

1 . . . moving object conference system, 2 . . . moving object, 3 . . . conference management device, 4 . . . shared display device, 5 . . . terminal device, 5a . . . driver's seat terminal device, 5b . . . assistant driver's seat terminal device, 5c . . . rear left seat terminal device, 5d . . . rear right seat terminal device, 6, 6a, 6b, 6c, 6d . . . individual touch panel, 7, 7a, 7b, 7c, 7d . . . camera, 8, 8a, 8b, 8c, 8d . . . voice output device, 9, 9a, 9b, 9c, 9d . . . voice input device, 10 . . . interior speaker, 11 . . . interior microphone, 12 . . . steering wheel, 13 . . . steering switch, 14 . . . seat, 14a . . . driver's seat, 14b . . . assistant driver's seat, 14c . . . rear left seat, 14d . . . rear right seat, 15 . . . instrument panel, 16 . . . meter panel, 17 . . . rearview mirror, 20 . . . processor, 21 . . . memory, 22 . . . communication device, 23 . . . login unit, 24 . . . seat discrimination unit, 25 . . . management unit, 30 . . . scheduled participant list, 31 . . . selection object, 32 . . . confirmation button, 33 . . . data image, 34 . . . participant list, 35 . . . speaker icon, 36 . . . individual operation screen, 37 . . . exit button, 38 . . . share button, 39 . . . chat button, 40 . . . other function button, 41 . . . chat box, 42 . . . camera button, 43 . . . volume button, 44 . . . microphone button, 45 . . . seat change button, 50 . . . application window, 51 . . . menu button.

What is claimed is:

1. A moving object conference system for a passenger to participate in an online conference via a communication network in an interior of a moving object, comprising:
   a management device including a processor;
   a shared display disposed at a position where the shared display can be seen by all passengers seated in the interior of the moving object; and
   individual touch panels disposed at positions where each individual touch panel can be individually operated by a respective passenger from a corresponding seat position,
   wherein
   the processor is configured to:
      manage conference information which is communication information of the online conference, for each of interior participants participating in the online conference from the interior of the moving object,
      for a common online conference that the plurality of interior participants participate in,
         display shared information to be distributed to all the participants of the common online conference, of the conference information, on the shared display, and
         display an individual operation screen to be individually operated by the participant of the common online conference on the corresponding individual touch panel,
      on the individual operation screen, a seat change button that is used when notifying the processor a seat of a change destination when the interior participant changes the seat is displayed, and
      when the seat change button is touched, the processor displays the individual operation screen for the interior participant who touches the seat change button on the individual touch panel which can be operated at the seat of the change destination.

2. The moving object conference system according to claim 1,
   wherein the processor is configured to determine a seat position where each of the interior participants is seated, and display the individual operation screen for each of the interior participants on the individual touch panel which can be individually operated from the seat position of the corresponding interior participant, based on the seat position of each of the interior participants.

3. The moving object conference system according to claim 2,
   wherein the processor is configured to acquire input indicating the seat position of the interior participant via the individual touch panel.

4. The moving object conference system according to claim 1,
   wherein the processor is configured to acquire an instruction regarding setting of a camera which individually photographs the interior participant, a microphone and a speaker individually used by the interior participant, and/or the individual touch panel via the individual operation screen, and set the camera, the microphone, the speaker and/or the individual touch panel based on the acquired instruction.

5. The moving object conference system according to claim 1,
   wherein the individual touch panel is disposed in front of each seat of the moving object.

* * * * *